(12) United States Patent
Galerne

(10) Patent No.: US 8,699,212 B2
(45) Date of Patent: Apr. 15, 2014

(54) ELECTRONIC READING APPARATUS, METHOD AND SYSTEM FOR USE IN HYPERBARIC AND HYPOBARIC CONDITIONS

(76) Inventor: Lionel Galerne, Mount Kisco, NY (US)

( * ) Notice: Subject to any disclaimer, the term of this patent is extended or adjusted under 35 U.S.C. 154(b) by 84 days.

(21) Appl. No.: 13/181,508

(22) Filed: Jul. 12, 2011

(65) Prior Publication Data

US 2013/0016469 A1 Jan. 17, 2013

(51) Int. Cl.
*G06F 1/16* (2006.01)
*H05K 5/00* (2006.01)
*H05K 7/00* (2006.01)

(52) U.S. Cl.
USPC ............ 361/679.04; 361/679.06; 361/679.07; 361/679.26

(58) Field of Classification Search
USPC ............. 361/679.04, 679.06, 679.07, 679.26, 361/679.01–679.6
See application file for complete search history.

(56) References Cited

U.S. PATENT DOCUMENTS

| | | | |
|---|---|---|---|
| 5,594,617 A * | 1/1997 | Foster et al. | 361/679.02 |
| 6,532,152 B1 * | 3/2003 | White et al. | 361/692 |
| 2007/0182663 A1 * | 8/2007 | Biech | 345/1.1 |
| 2008/0055833 A1 * | 3/2008 | Hori et al. | 361/681 |
| 2009/0009945 A1 * | 1/2009 | Johnson et al. | 361/681 |
| 2011/0164066 A1 * | 7/2011 | Beals et al. | 345/685 |

* cited by examiner

*Primary Examiner* — Anthony Haughton
*Assistant Examiner* — Zhengfu Feng
(74) *Attorney, Agent, or Firm* — The Miller Law Offices PLC; Steven J. Miller, Esq.

(57) ABSTRACT

The present invention relates to an apparatus, method and system for electronic readers to be used by personnel operating in sensitive environments wherein inherently safe electronic equipment is either preferable or required, said environments include, but are not limited to, living and working within a hyperbaric/hypobaric containment vessel for extended periods. This invention provides a safe reliable mobile media device that allows people that operate in environments where electronic safety is particularly important, such environments include, but are not limited to, individuals placed under hyperbaric conditions; it provides an alternative means to communicate to the outside world through Internet applications. In addition, the instant invention allows individual the ability to read electronic books, download and upload technical information, curriculum and personal data, programs and data in real time.

12 Claims, 12 Drawing Sheets

CLOSED

OPEN

DETAIL 8A
SCALE 1 : 1

ROTATED 90°

ELECTRONIC READING APPARATUS, METHOD AND SYSTEM FOR USE IN HYPERBARIC AND HYPOBARIC CONDITIONS

CROSS REFERENCE TO RELATED APPLICATIONS

None.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND OF THE INVENTION

The present invention relates to an apparatus, method and system for electronic readers to be used by personnel operating in sensitive environments wherein inherently safe electronic equipment is either preferable or required, said environments include, but are not limited to, living and working within a hyperbaric/hypobaric containment vessel.

The fundamental purpose of this invention is to provide a safe reliable mobile media device that will allow people that work or operate in environments where electronic safety is particularly important, such environments include, but are not limited to, individuals placed under hyperbaric or hypobaric conditions; it provides an alternative means to communicate to the outside world through Internet applications. In addition, the ability to read electronic books, download and upload technical information, curriculum and personal data.

At this time there is no know device that incorporates a combination of inherently safe electronic hardware specifically designed for continuous use in ambient operating pressures greater than 1 ATM in addition to continuous operation in high concentrations of mixed gases, other than normal Oxygen-Nitrogen atmospheric gases.

In the prior art, there are three common hardware components, which either can pose economic hardship through damage and waste or through great danger of personnel harm while placed under hyperbaric conditions.

1 The most common component of the mobile media devices are LCD (Liquid Crystal Display) screens. LCD screens have a proven history of fracture while under intense pressure, which may pose a potential harm to the persons operating under said pressure. Further, the devices are rendered useless once the LCD is fractured.

2 The second most common component found in standard media devices are the LED (Light Emitting Diode) and CCFL (Cold Cathode Fluorescent Light) backlight bulbs. LED and CCFL bulbs can pose both hardship and potential danger to the Hyperbaric/Hypobaric occupants. These bulbs are fabricated with a glass enclosure with toxic chemicals contained therein, and when said bulb glass fractures or breaks under hyperbaric pressure, or Hypobaric vacuum said toxic chemicals are released together with dangerous glass shards and said toxic gaseous chemicals and glass shards will contaminate the breathing gas environment as well as expose the operating personnel to possible lacerations. Human lacerations under hyperbaric/hypobaric conditions are far more susceptible to infections. Further, breathing toxic gases can lead to respiratory complications for the occupant.

3 The third and most dangerous component is the standard NiCad and or Lithium battery. These batteries pose a proven high risk to the occupants due to the potential risk of flash fires that can burn with intense heat. These flash fires not only produce intense heat but also emit deadly poisonous gases. A situation with combustion and fire can leave the occupants trapped under pressure in conditions that can be fatal.

The present invention solves all of these aforementioned problems existing in the prior art, by providing a unique design, arrangement and system of a number of electronic components, said unique design, arrangement and system eliminating the dangers and disadvantages set forth above, and providing an electronic reader/writer assembly that is inherently safe in the extreme operating pressures/vacuum and gaseous conditions for human personnel working for extended periods in said extreme conditions. Said unique electronic reader/writer tablet design, arrangement and system invention is more particularly described below.

SUMMARY OF THE INVENTION

The invention is comprised of an electronic tablet based on a single board, computing platform with integrated central computing unit, digital dual processing chip, power management chip, WiFi, Bluetooth, USB and other interfaces. The tablet has special low power electronics coupled with passive solar charging of onboard battery systems to provide for rejuvenating electrical current without direct user effort. (Apart from leaving, the unit exposed to direct light.) The dual display e-book permits the viewing of content as in a conventional book, both sides.

Bi-fold rubberized easy grip housing case
   Inherently safe Integrated clamshell hinge design containing
      1. Alkaline Batteries
      2. Dual Speakers
      3. Magnetic self centering closure clasps
      4. Dual full size liquid particle color display
   Housing rugged and water resistant
   Solar recharging cells and trickle charge circuit
   Rubber bumper to provide protection together with a dust shield
   Helium relief valve
   High ambient pressure inherently safe liquid particle displays each also having capacitance/resistive touch screens for user input
   Soft key auto hide
   Onboard Wi-Fi with static IP address settable
   Mono or Stereo audio out/in
   Protected and restricted high capacity micro SD slot
   512-MB LPDDR RAM min
   Mini USB port for direct power management
   Bluetooth
   Power management system with cover sleep, hibernate, and shutdown
   USB recharge Further, the invention further comprises the capability of properly functioning with a single, rather than double leaf tablet, with the software operating system being capable of recognizing the removal of one of the tablet leaves, and adjusting the content display on the remaining single tablet display accordingly.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

In the drawings:

FIGS. 8A and 8B are detailed call-outs of the female magnetic clasp of FIG. 8.

DESCRIPTION OF THE PREFERRED EMBODIMENT

Figure 1:
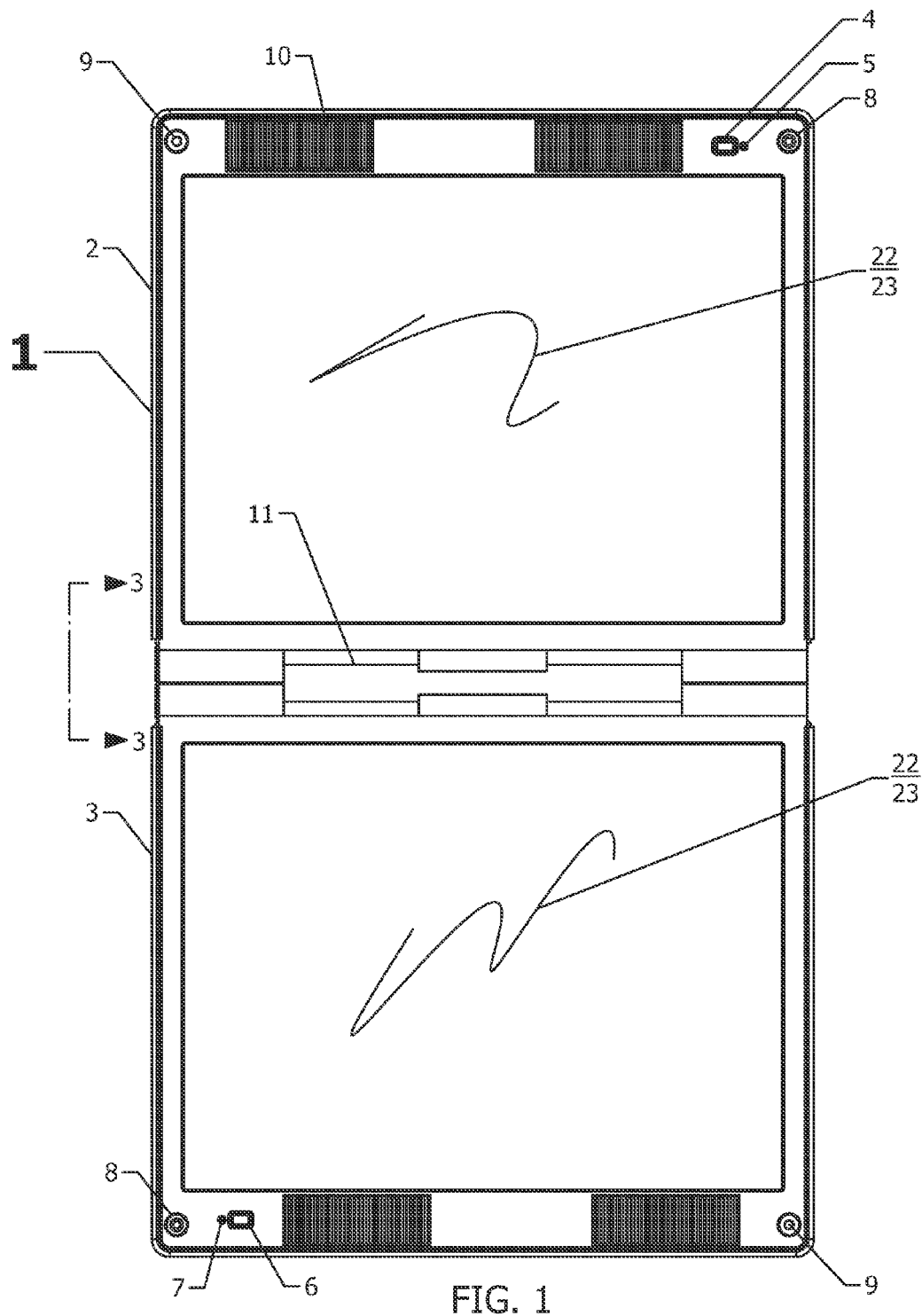
FIG. 1 is a plan view of the preferred embodiment of the present invention.
Figure 2A:
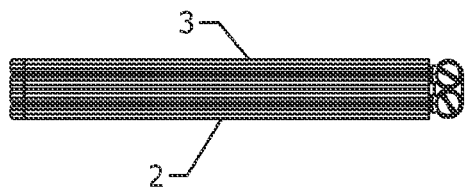
FIGS. 2A thru 2E are elevation views of a preferred embodiment of the present invention, illustrating the embodiment transitioning from the closed to the open position.
Figure 2B:
Figure 2C:
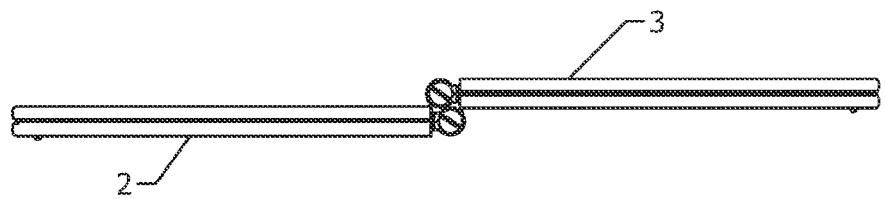
Figure 2D:
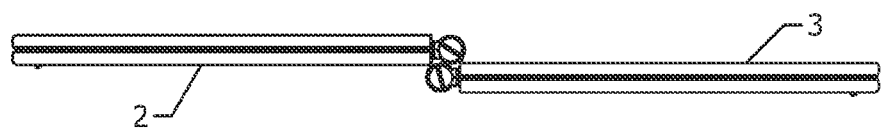
Figure 2E:
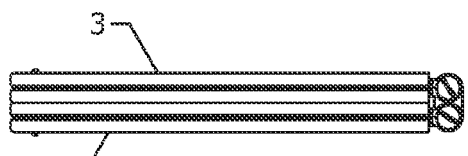
Figure 3:
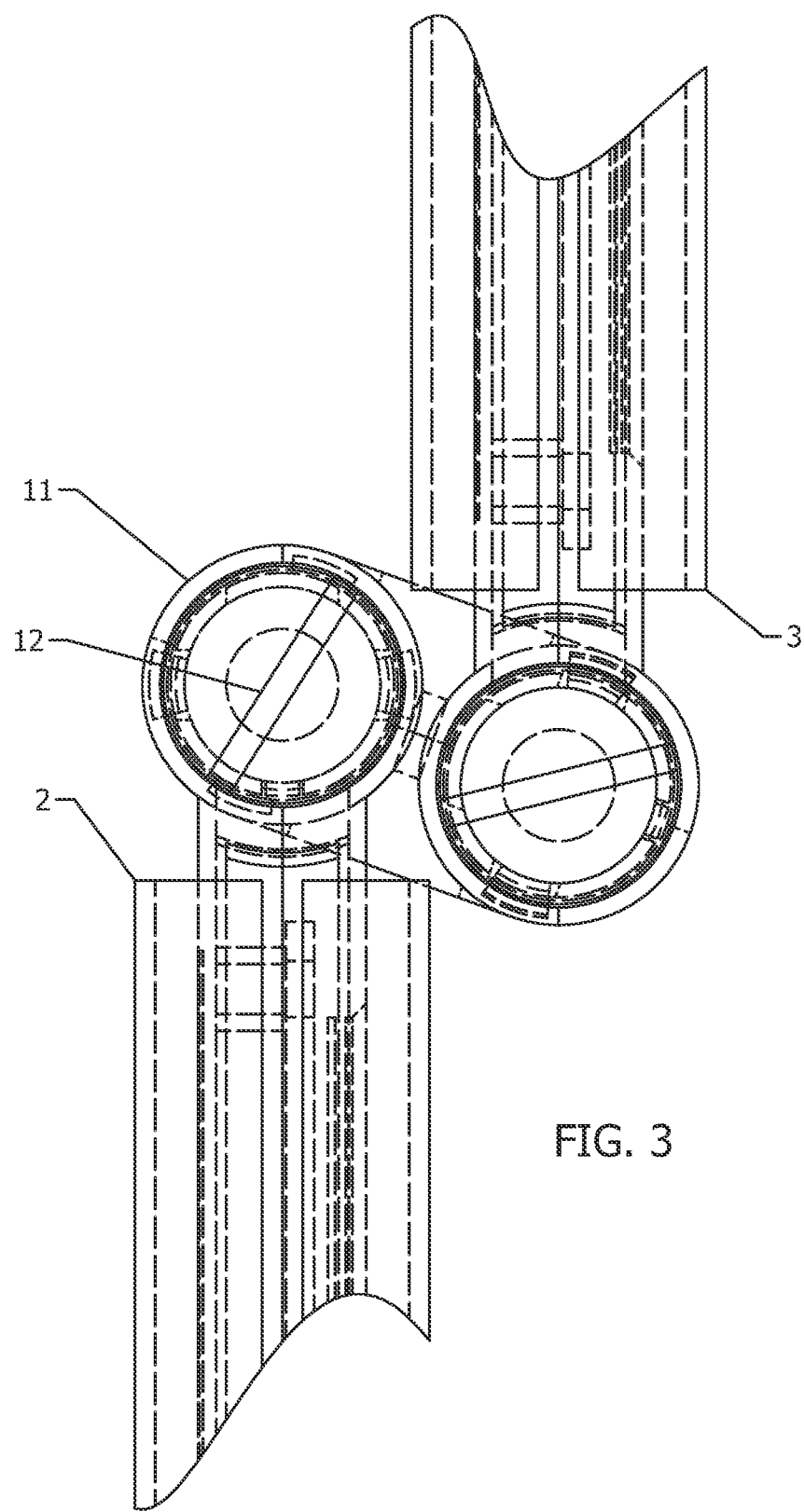
FIG. 3 is an elevation view of a preferred embodiment of the present invention.
Figure 4:
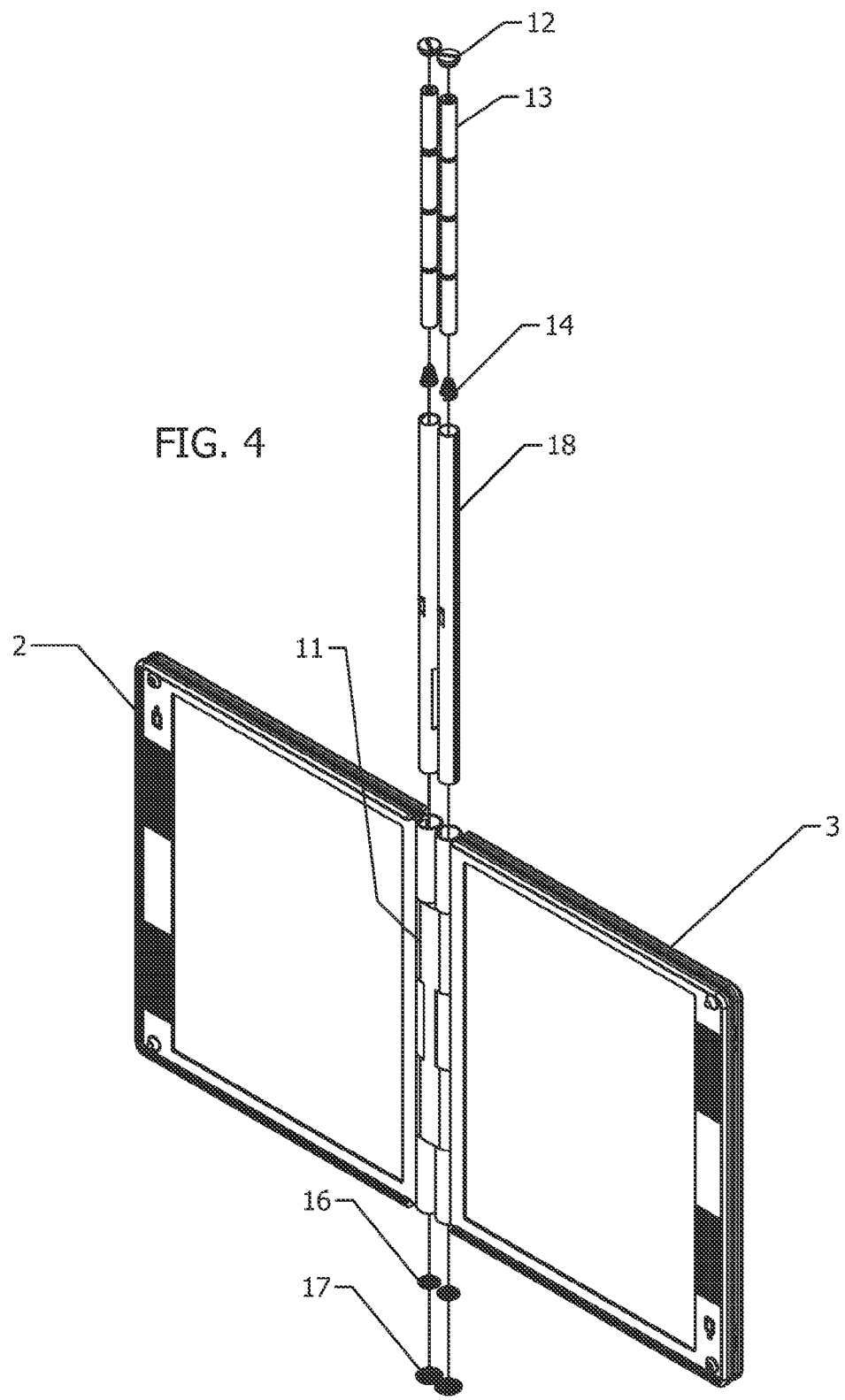
FIG. 4 is a perspective view of the preferred embodiment of the present invention.
Figure 5:
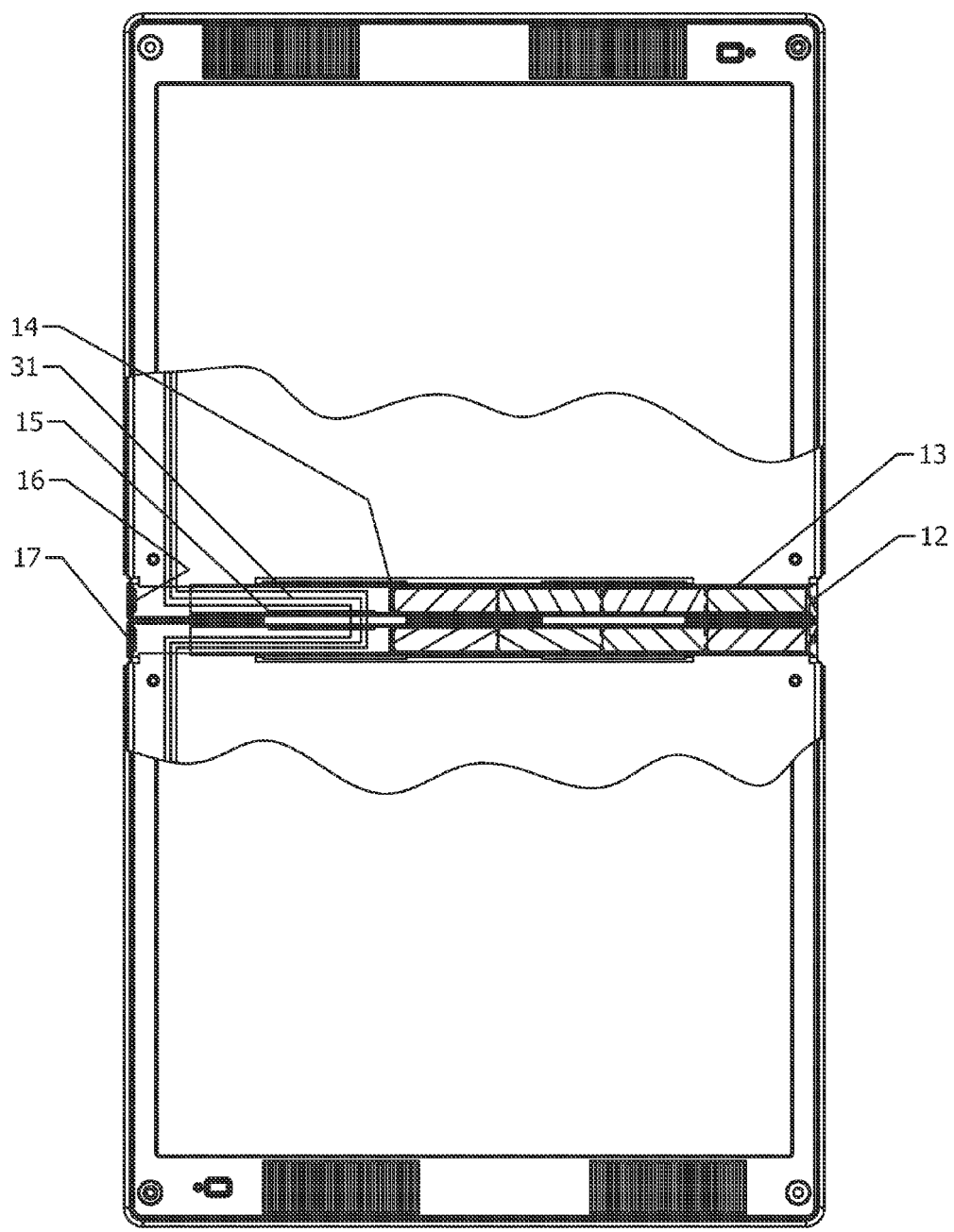
FIG. 5 is a plan view of a preferred embodiment of the present invention.
Figure 6:
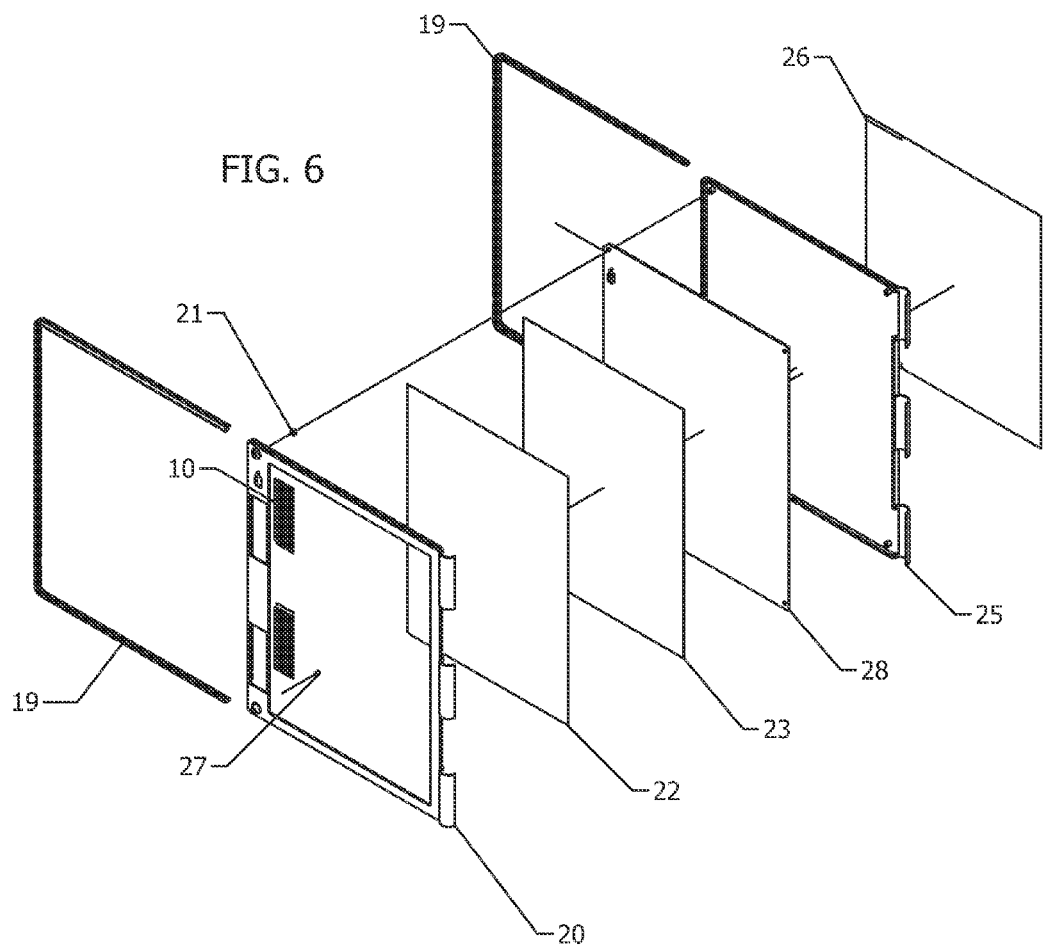
FIG. 6 is a perspective view of the preferred embodiment of the present invention.
Figure 7:
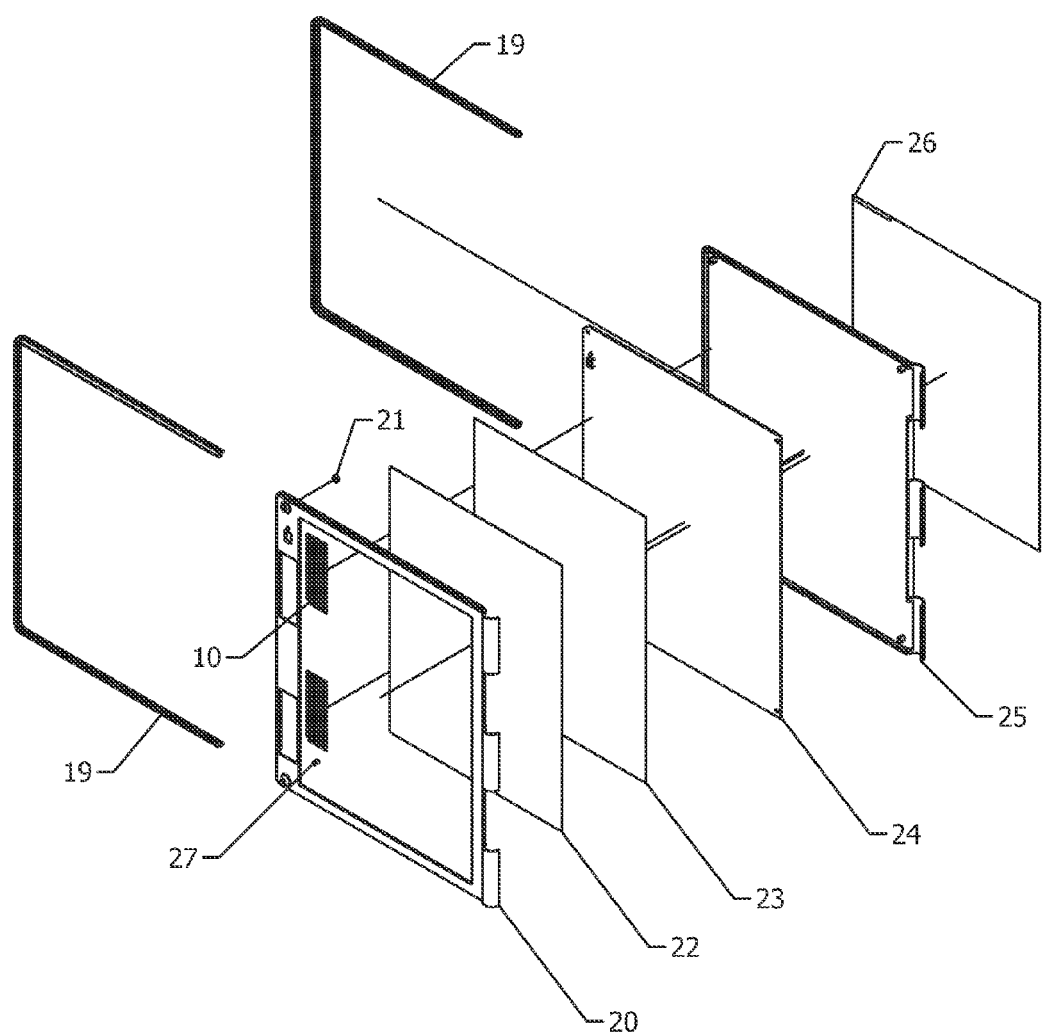
FIG. 7 is a perspective view of the preferred embodiment of the present invention.
Figure 8:
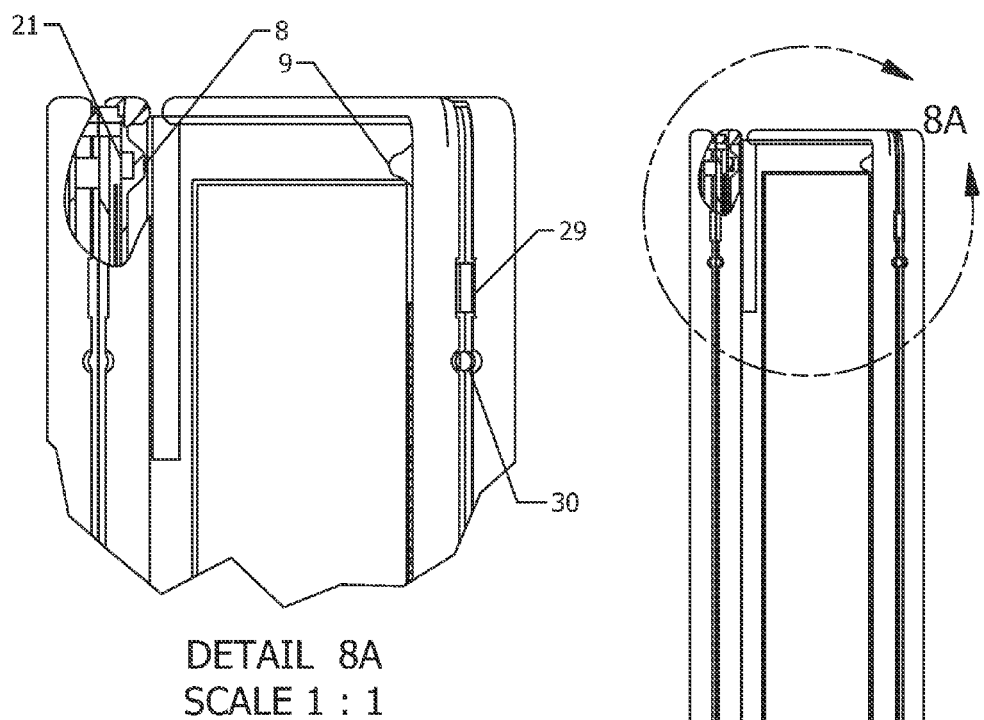
FIG. 8 is an elevation view of the preferred embodiment of the present invention.
Figure 8B:
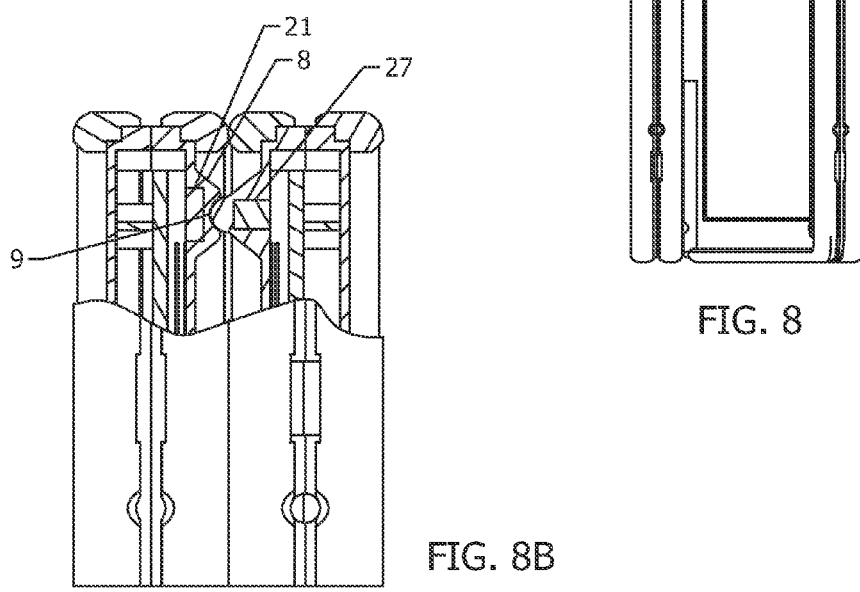
Figure 9:
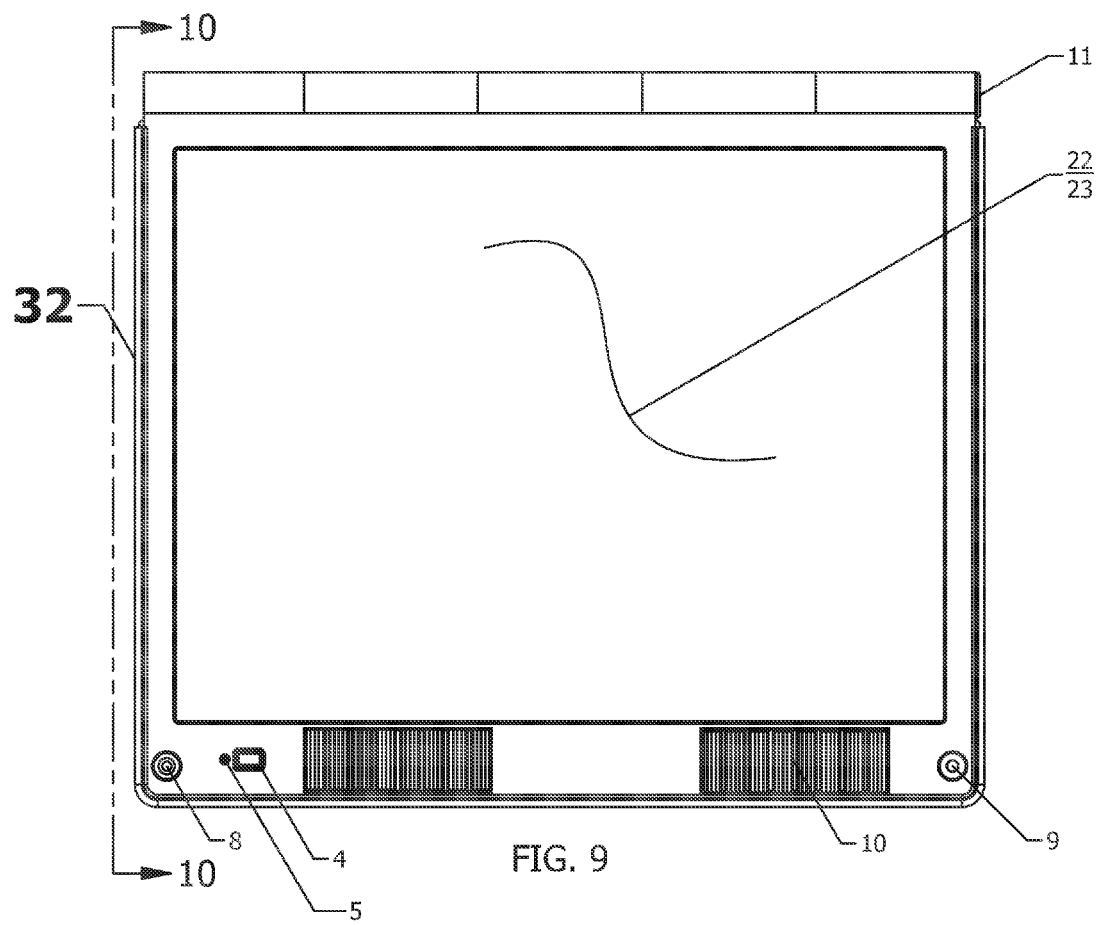
FIG. 9 is a plan view of the preferred embodiment of the present invention, showing alternate single tablet leaf arrangement.
Figure 10:
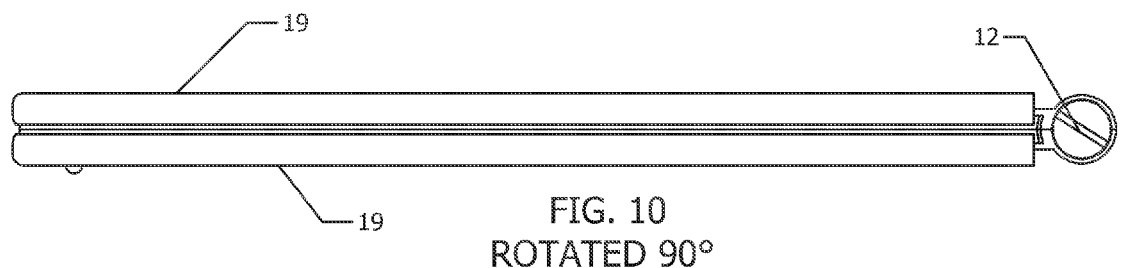
FIG. 10 is an elevation view of a preferred embodiment of the present invention, showing alternate single tablet leaf arrangement.
Figure 11:
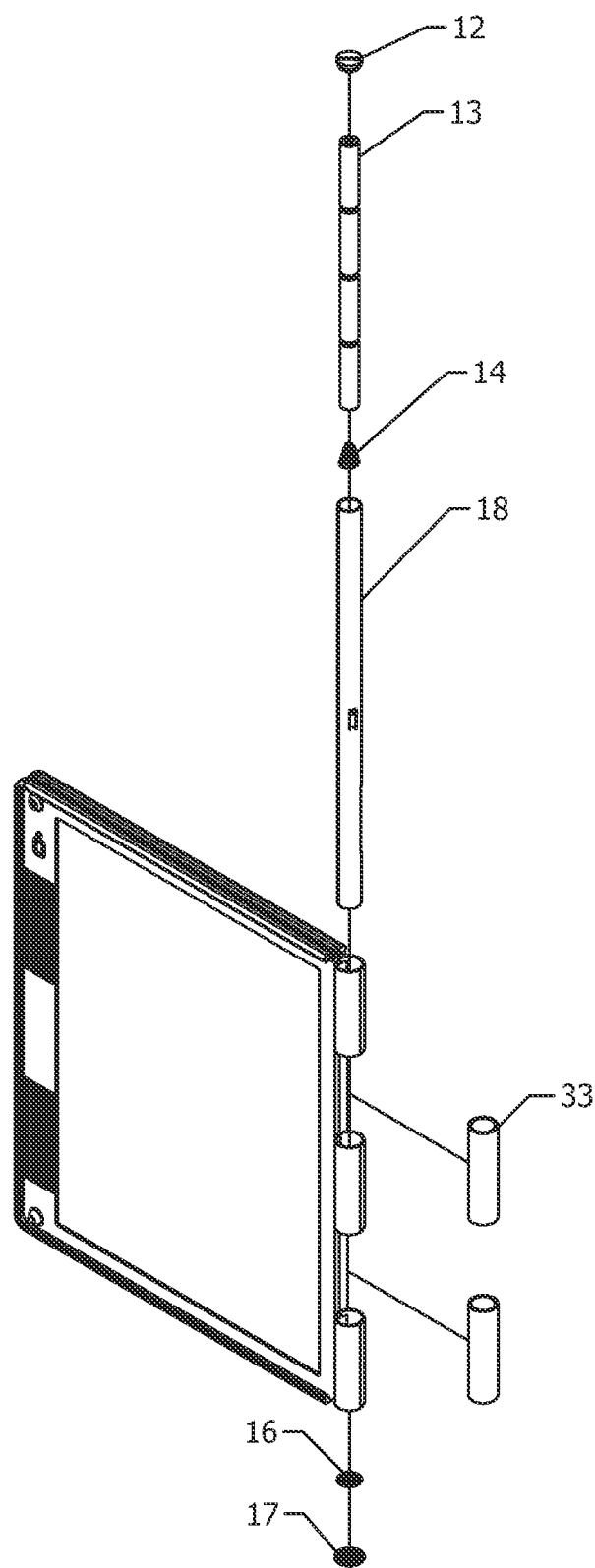
FIG. 11 is a perspective view of a preferred embodiment of the present invention, showing alternate single tablet leaf arrangement.
Figure 12:
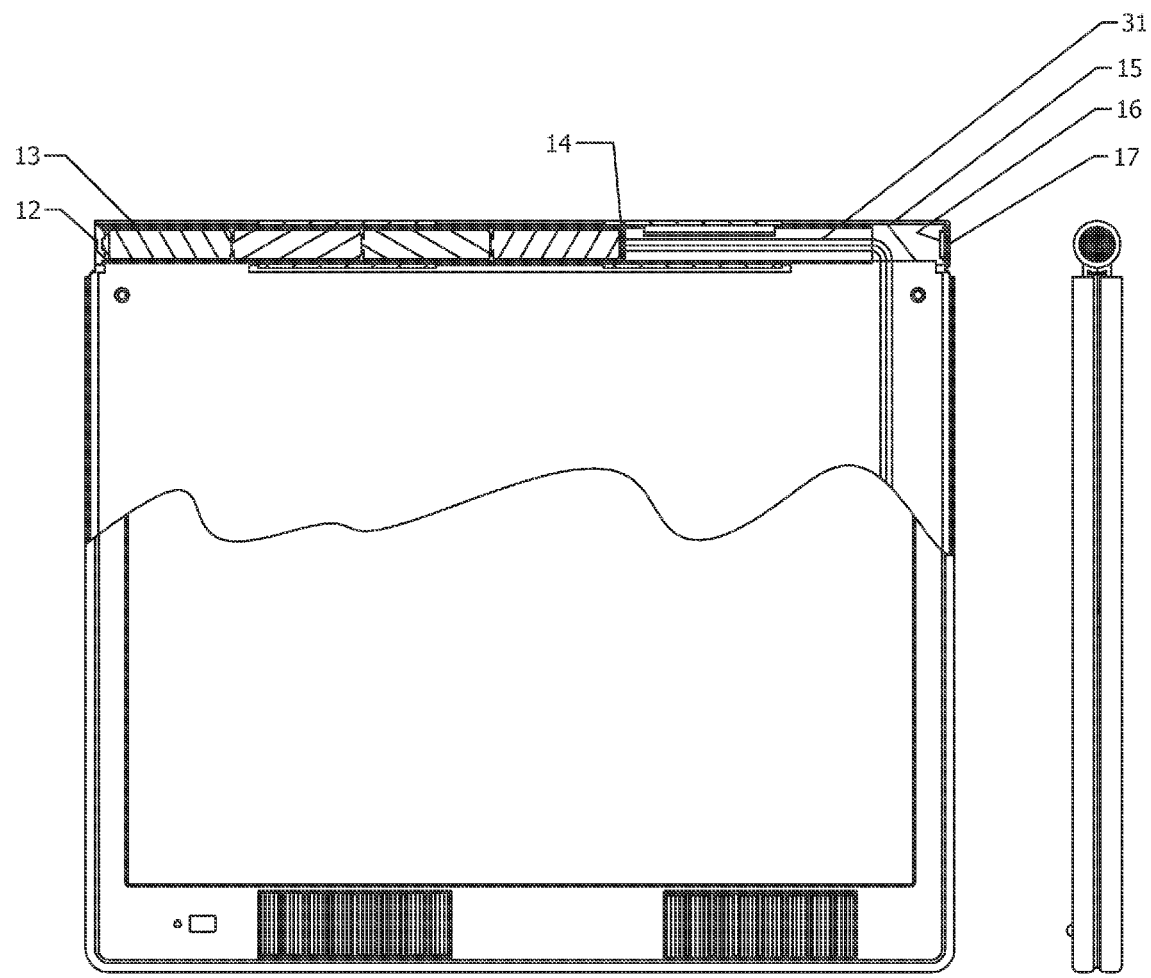
FIG. 12 contains a plan and elevation view of the preferred embodiment of the present invention, showing alternate single tablet leaf arrangement.
Figure 13:
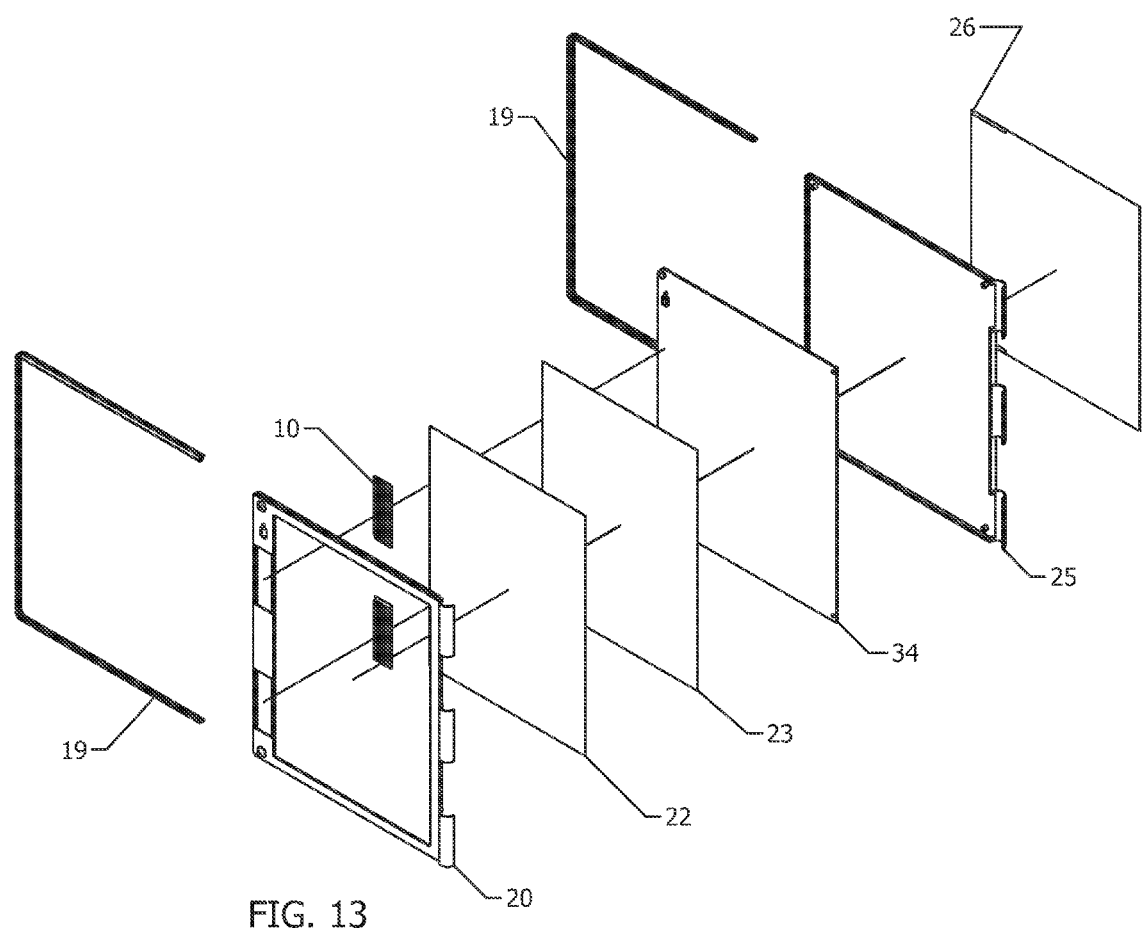
FIG. 13 is a perspective view of the preferred embodiment of the present invention, showing alternate single tablet leaf arrangement.

With reference now to the attached FIGS. 1 through 13, the present invention provides a single or dual screen, hand-held, or wall mounted electronic reader/writer that can receive and send email, download and play music files, download and display E-books and pictures, provide technical proprietary programs and data safely in a hyperbaric/hypobaric environments, providing communications and entertainment to persons working and living in confined/closed and pressurized chambers, with said chambers having ambient gaseous mixtures other than the standard atmospheric Oxygen-Nitrogen concentrations. The dual screen reader/writer comprises a left screen assembly 2 and a right screen assembly 3, each containing high ambient pressure inherently safe liquid particle displays 23, and said displays being connected by an inherently safe hollow articulated hinge assembly 11 that provides a protected path for electrical conductors between the screen assemblies and the main processing unit printed circuit board 28. The left screen assembly further houses USB & miniature audio connectors. Conductors of a flexible cable 31 or printed circuit routed through the hollow, two axis articulated hinge allow the dual screen E-book reader with rotating case halves to possess two display screens 23 in each half of the case. The conductors routed through the articulated hollow hinge are generally centered about one axis of hinge rotation for approximately one fifteenth the length of the axis, whereupon they transition by a U-turn to continue as centered about the other axis of hinge rotation. The conductors may be an integral part of a flexible printed circuit assembly having portions located in both halves of the E-book reader's case. Strain reliefs at the locations where the conductors traverse the case halves, and two in the hinge, at about the center thereof, limit and apportion the torsional flexing experienced by the conductors. The torsional flexing experienced by the flexible conductors increases the number of cycles of rotation they can undergo without breaking, as compared to conventional bending. The hollow articulated hinge allows one case half to rotate one full revolution about the other, so that the E-book reader can be opened and held in one hand. By being within the hollow hinge the conductors are protected from injury. The hollow articulated hinge further houses two speakers 16 for audio output. The two axes of the articulated hinge are held in place and permitted to freely rotate with respect to each other by means of two tubular battery compartment tubes 18 that serve as pins for the articulated hinge 11. The battery compartment tubes mechanically connect the two screen assemblies and house rechargeable alkaline cells 13. The cells are inherently safe under hyperbaric/hypobaric pressure, provide renewable power and are recharged via two solar arrays 26 when the dual screen reader/writer is closed and an additional four solar arrays 10 when it is opened. The displays can each serve as inherently safe informational displays or keyboards for user input such as email, conducting web searches or entering specific URLs. The display is reflective in nature and therefore does not require Cold Cathode Fluorescent Lamps that are potentially dangerous under hyperbaric pressure or hypobaric vacuum. The dual screen reader/writer further comprises four protective rubber edge bumpers 19 that protect it from impact damage and also serve to seal the dual screen reader/writer from dirt, dust and other debris when it is closed. The dual screen reader/writer employs a male magnetic clasp half 9 and a female magnetic clasp half 8 to keep it closed and limit the rotational movement of the articulated hinge, when not in use.

The single screen reader/writer comprises screen assembly 32 containing a high ambient pressure inherently safe liquid particle display 23, whose wiring is accommodated by an inherently safe hollow wiring passage 15 that provides a protected path for electrical conductors between the display and the main processing unit printed circuit board 34. The single screen assembly also houses USB & miniature audio connectors. Conductors of a flexible cable 31 or printed circuit are routed through wiring passage allow the single screen printed circuit assemblies reader to connect to rechargeable alkaline cells 13. By being within the hollow wiring passage the conductors are protected from injury. The hollow wiring passage also houses a speaker 16 for audio output. The battery compartment tube 18 mechanically connects the screen assembly and houses the rechargeable alkaline cells 13. The alkaline cells are inherently safe under hyperbaric pressure/ hypobaric vacuum, providing renewable power and are recharged via a solar array 26 when the single screen reader/ writer is not in use and are recharged via an additional two solar arrays 10 when it is in use. The display can each serve as inherently safe informational displays or keyboards for user input such as email, conducting web searches or entering specific URLs. The display is reflective in nature and therefore does not require Cold Cathode Fluorescent Lamps that are potentially dangerous under hyperbaric pressure/hypobaric vacuum. The single screen reader/writer further comprises four protective rubber edge bumpers 19 that protect it from impact damage. The single screen reader/writer employs a male clasp half 9 and a female clasp half 8 to permit it to be placed in a screen-down orientation so that the solar array may be maximally exposed to light, protecting the touch screen while it is in that orientation. The single screen hinge spacer 33 is employed to protect the battery compartment tube.

While the present invention has been particularly described, in conjunction with a preferred embodiment, it is evident that many alternatives, modifications and variations will be apparent to those skilled in the art in light of the foregoing description It is therefore contemplated that the instant disclosure will embrace any such alternatives, modifications and variations as falling within the true scope and spirit of the present invention.

In so far as the description above and the accompanying drawing disclose any additional subject matter that is not within the scope of the limited claims below, the inventions are not dedicated to the public and the right to file one or more applications to claim such additional inventions is reserved.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

What is claimed is:

1. An inherently safe tablet based electronic reader apparatus for safe use by individuals working and living in extreme hyperbaric and hypobaric conditions for extended periods of time, said apparatus comprising: a complete set of components that are inherently safe in the extreme operating pressures/vacuum and gaseous conditions for human personnel working for extended periods in said extreme conditions, wherein said complete set of inherently safe components are (a) dual bi-fold leaf tablet with rubberized easy grip housing case, (b) inherently safe integrated clamshell hinge design containing alkaline batteries, dual speakers, magnetic self centering closure clasps, (c) rugged and water resistant housing, (d) solar recharging cells together with a trickle charge circuit, (e) tablet enclosure energy absorbing bumpers to provide impact and shock protection together with an enclosure dust shield, (f) helium relief valve, (g) high ambient pressure inherently safe liquid particle displays each also having capacitance/resistive touch screens for user input, (h) soft key auto hide, (i) onboard Wi-Fi with static IP address settable, (j) mono or stereo audio out/in, (k) protected and restricted high capacity memory slot, (l) MB LPDDR RAM minimum, (m) mini USB port for direct power management, (n) power management system with cover sleep, hibernate, and shutdown, (o) USB recharge.

2. The apparatus of claim 1, wherein the device is used by individuals operating in extreme hypobaric, rather than extreme hyperbaric, conditions.

3. The apparatus of claim 1, wherein the apparatus may be operated as a single tablet display unit, with one of the bi-fold tablet leaves removed.

4. The apparatus of claim 1, wherein the device also has wireless communications capability.

5. An inherently safe tablet based electronic reader method for safe use by individuals working and living in extreme hyperbaric and hypobaric conditions for extended periods of time, said method comprising: a complete set of components that are inherently safe in the extreme operating pressures/vacuum and gaseous conditions for human personnel working for extended periods in said extreme conditions, wherein said complete set of inherently safe components are (a) having a dual bi-fold leaf tablet with rubberized easy grip housing case, (b) having inherently safe integrated clamshell hinge design containing alkaline batteries, dual speakers, magnetic self centering closure clasps, (c) having rugged and water resistant housing, (d) having solar recharging cells together with a trickle charge circuit, (e) having tablet enclosure energy absorbing bumpers to provide impact and shock protection together with an enclosure dust shield, (f) having a helium relief valve, (g) having high ambient pressure inherently safe liquid particle displays each also having capacitance/resistive touch screens for user input, (h) having soft key auto hide, (i) having onboard Wi-Fi with static IP address settable, (j) having mono or stereo audio out/in, (k) having protected and restricted high capacity memory slot, (l) having 512-MB LPDDR RAM minimum, (m) having mini USB port for direct power management, (n) having power management system with cover sleep, hibernate, and shutdown, (o) having USB recharge.

6. The method of claim 5, wherein the method is used by individuals operating in extreme hypobaric, rather than extreme hyperbaric, conditions.

7. The method of claim 5, wherein the method has only a single tablet display unit, with one of the bi-fold tablet leaves removed.

8. The method of claim 5, wherein the method also has wireless communications capability.

9. An inherently safe tablet based electronic reader system for safe use by individuals working and living in extreme hyperbaric and hypobaric conditions for extended periods of time, said system comprising: a complete set of components that are inherently safe in the extreme operating pressures/vacuum and gaseous conditions for human personnel working for extended periods in said extreme conditions, wherein said complete set of inherently safe components are (a) having a dual bi-fold leaf tablet with rubberized easy grip housing case, (b) having inherently safe integrated clamshell hinge design containing alkaline batteries, dual speakers, magnetic self centering closure clasps, (c) having rugged and water resistant housing, (d) having solar recharging cells together with a trickle charge circuit, (e) having tablet enclosure energy absorbing bumpers to provide impact and shock protection together with an enclosure dust shield, (f) having a helium relief valve, (g) having high ambient pressure inherently safe liquid particle displays each also having capacitance/resistive touch screens for user input, (h) having soft key auto hide, (i) having onboard Wi-Fi with static IP address settable, (j) having mono or stereo audio out/in, (k) having protected and restricted high capacity memory slot, (l) having 512-MB LPDDR RAM minimum, (m) having mini USB port for direct power management, (n) having power management system with cover sleep, hibernate, and shutdown, (o) having USB recharge.

10. The system of claim 9, wherein the system is used by individuals operating in extreme hypobaric, rather than extreme hyperbaric, conditions.

11. The system of claim 9, wherein the system has only a single tablet display unit, with one of the bi-fold tablet leaves removed.

12. The system of claim 9, wherein the system also has wireless communications capability.

\* \* \* \* \*